United States Patent [19]

Sibata

[11] Patent Number: 5,220,228
[45] Date of Patent: Jun. 15, 1993

[54] ROTATING ELECTRIC MACHINE WITH BEVELLED ARMATURE POLES

[75] Inventor: Yutaka Sibata, Komagane, Japan

[73] Assignee: Sankyo Seiki Mfg. Co., Ltd., Nagano, Japan

[21] Appl. No.: 656,310

[22] Filed: Feb. 15, 1991

[30] Foreign Application Priority Data

Feb. 16, 1990 [JP] Japan .................. 2-14569[U]

[51] Int. Cl.$^5$ .................. H02K 5/24; H02K 21/12; H02K 1/12
[52] U.S. Cl. .................. 310/254; 310/51; 310/156; 310/187; 310/265
[58] Field of Search .............. 310/254, 111, 156, 226, 310/261, 265, 266, 269, 187, 51, 191, 193, 216

[56] References Cited

U.S. PATENT DOCUMENTS

| 606,912 | 7/1898 | Blathy et al. | 310/156 |
|---|---|---|---|
| 3,956,678 | 5/1976 | Byrne et al. | 318/138 |
| 4,216,400 | 8/1980 | Lynch et al. | 310/154 |
| 4,504,755 | 3/1985 | Semones et al. | 310/156 |
| 4,642,502 | 2/1987 | Carpenter et al. | 310/156 |
| 4,670,696 | 6/1987 | Byrne et al. | 318/701 |
| 4,698,537 | 10/1987 | Byrne et al. | 310/168 |
| 4,719,382 | 1/1988 | Listing | 310/187 |
| 4,725,751 | 2/1988 | Bassler et al. | 310/184 |
| 4,755,702 | 7/1988 | Iijima et al. | 310/166 |
| 4,812,692 | 3/1989 | Arita | 310/49 R |
| 4,868,438 | 9/1989 | Okamoto et al. | 310/166 |
| 4,871,934 | 10/1989 | Okamoto et al. | 310/166 |
| 4,888,512 | 12/1989 | Shimizu | 310/156 |
| 4,933,584 | 6/1990 | Harms et al. | 310/162 |

FOREIGN PATENT DOCUMENTS

| 57130587 | 2/1956 | Japan . |
|---|---|---|
| 54-69703 | 6/1979 | Japan . |
| 56-145765 | 11/1981 | Japan . |
| 62-101374 | 6/1987 | Japan . |
| 62-154758 | 10/1987 | Japan . |

Primary Examiner—Steven L. Stephan
Assistant Examiner—D. R. Haszko
Attorney, Agent, or Firm—McAulay Fisher Nissen Goldberg & Kiel

[57] ABSTRACT

A rotating electric machine comprises an armature arrange opposite the periphery of a magnet which is rigidly fitted to a rotary shaft. The armature has a plurality of salient poles arranged on it and projecting towards the magnet. The machine is characterized in that the surface of each of the salient poles facing the magnet comprises bevelled areas arranged at the lateral ends thereof and the magnet is a hollow cylindrical ring magnet. With such an arrangement, its induced voltage can show a sustained sinusoidal waveform which is free from high harmonics to an extent greater or equal to that of a rotating electric machine comprising a segmented magnet and consequently the level of cogging of the inventive machine can be minimized. If the ring magnet of a rotating electric machine according to the invention is skewedly magnetized relative to the axis of the ring magnet, the effect of the machine in maintaining the sinusoidal waveform of the induced voltage can be further enhanced.

4 Claims, 3 Drawing Sheets

ROTATING ELECTRIC MACHINE WITH BEVELLED ARMATURE POLES

BACKGROUND OF THE INVENTION

1. Field of the Invention

This invention relates to a rotating electric machine comprising an armature having a plurality of salient poles arranged opposite the periphery of a magnet rigidly fitted to a rotary shaft.

2. Background Prior Art

Of various rotating electric machines to be used for electric motors and generators, there is a type of machine comprising an armature arranged opposite the outer periphery of a magnet. Such a rotating electric machine normally has a configuration as illustrated in FIG. 5 of the accompanying drawings.

FIG. 5 illustrates an AC servomotor comprising an inner rotor type DC brushless motor having a concentric winding arrangement. As illustrated, a plurality of semicylindrical magnet segments 2 are rigidly fitted to the outer periphery of a yoke 1 which is integral with a rotary shaft and surrounded by an armature 3 which performs the role of a stator. Armature 3 comprises a plurality of salient poles 4 projecting radially and inwardly toward the segmented magnet 2.

The inner surface 4a of each of the salient poles 4 that faces the segmented magnet 2 a circular arc arranged on an imaginary circle concentrically drawn around the rotary shaft and having a radius of $\phi$. The outer surface of each of the magnet segments 2 facing the inner surfaces 4a of the salient poles 4 also exhibits a circular arc having a radius of curvature Rb in an attempt to induce a voltage having a sinusoidal waveform in the winding with a least level of cogging.

With a rotating electric machine having an arrangement as described above, the cost of manufacturing magnet segments 2, each having a curved surface with a radius of curvature of Rb, can be very high because of the elaboration required to produce such curved surfaces.

Although the use of a hollow and cylindrical ring magnet having a radial anisotropy in place of a segmented magnet has been proposed to bypass the problem of high manufacturing cost, such a ring magnet cannot induce a voltage having a sinusoidal waveform because of the existence of residual high harmonics. Consequently, the level of cogging will be considerably high.

It is, therefore, an object of the present invention to provide a rotating electric machine comprising a magnet having a radial anisotropy that can induce a voltage having a sinusoidal waveform with a low level of cogging.

SUMMARY OF THE INVENTION

According to the invention, the above object is achieved by providing a rotating electric machine comprising an armature arranged opposite the periphery of a magnet rigidly fitted to a rotary shaft. The armature has a plurality of salient poles arranged on it and projecting toward the magnet. The surface of each of the salient poles facing the magnet comprises bevelled areas arranged at the lateral ends thereof and the magnet is a hollow cylindrical ring magnet. The magnet of the rotating electric machine is skewedly magnetized relative to the axis of the ring magnet.

With a rotating electric machine according to the invention and having an arrangement as described above, any abrupt changes of magnetic field that may take place in the salient poles can be effectively moderated so that the induced voltage exhibits a sinusoidal waveform with a low level of cogging in spite of the use of a ring magnet having a radial anisotropy.

A rotating electric machine having a ring magnet skewedly magnetized relative to the axis of the ring magnet according to the invention can enhance the effect of inducing a voltage having a sinusoidal waveform with a least level of cogging.

For a better understanding of the present invention, reference is made to the following description and accompanying drawings while the scope of the invention will be pointed out in the appended claims.

DETAILED DESCRIPTION OF THE INVENTION

Figure 1:
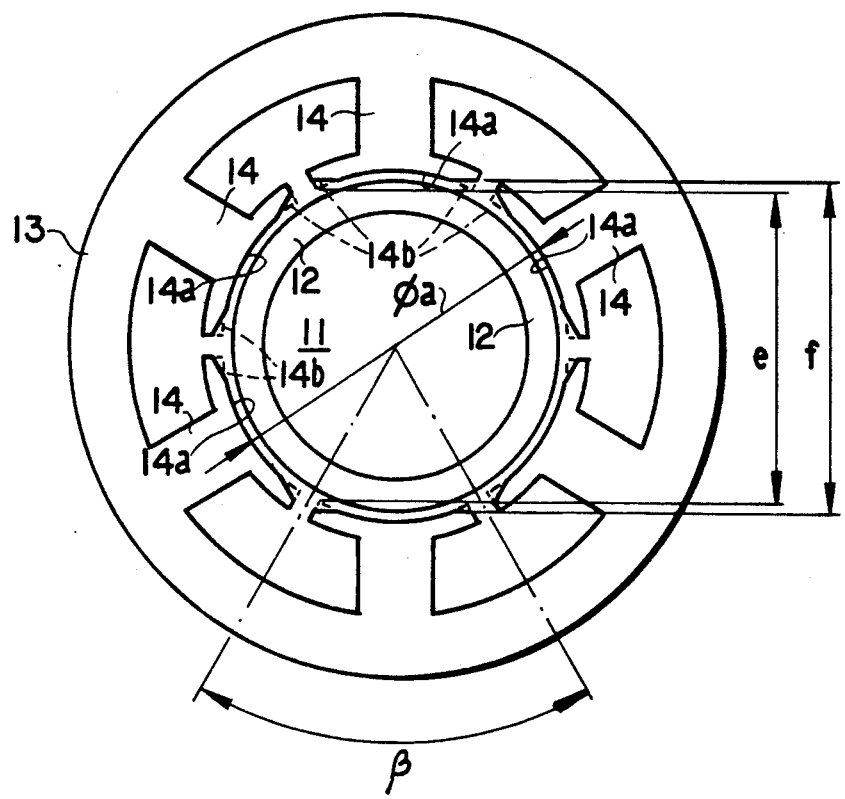
FIG. 1 illustrates a principal portion of a preferred embodiment of the invention.

FIG. 1 illustrates an AC servomotor comprising an inner rotor type DC brushless motor having a concentrated winding arrangement which is realized by applying the concept of the present invention. In this figure, a hollow cylindrical ring magnet 12 having a radial anisotropy is rigidly fitted to the outer periphery of a yoke 11 which is integral with a rotary shaft and surrounded by an armature 13 that takes the role of a stator.

Armature 3 comprises a plurality of salient poles 14 projecting radially and inwardly toward the ring magnet 12 having a radial anisotropy. The inner surface 14a of each of the salient poles 14 that faces the ring magnet 12 having a radial anisotropy exhibits a circular arc arranged on an imaginary circle concentrically drawn around the rotary shaft and having a radius of $\phi a$. The inner surface 14a of each of the salient poles 14 also comprises bevelled areas 14b, 14b arranged at the lateral ends thereof. The surface of each of the bevelled areas 14b, 14b is substantially perpendicular to a radial line along which the related salient pole 14 is projecting or substantially parallel to a line tangential to the salient pole 14.

The distance f and e in FIG. 1 respectively represent the distance between the front ends of a pair of oppositely disposed salient poles of the embodiment and the distance between the front ends of a pair of oppositely disposed salient poles of a conventional rotating electric machine. The relationship between the two values is expressed by the formula below.

$$f = (1.02 \sim 1.08) \times e$$

As may be easily understood from the formula, the distance between the front ends of a pair of oppositely disposed salient poles of the embodiment is slightly greater than its counterpart of a conventional rotating electric machine. Reference code $\beta$ in FIG. 1 denotes the pitch (angle) of the slot arrangement.

Figure 2A:
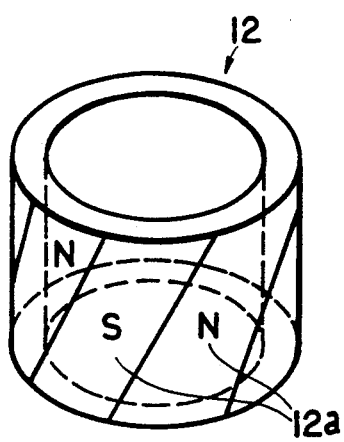
FIG. 2(a) and (b) respectively illustrate a perspective view and an extended plan view of a ring magnet having a radial anisotropy to be used for the embodiment of FIG. 1.
Figure 2B:
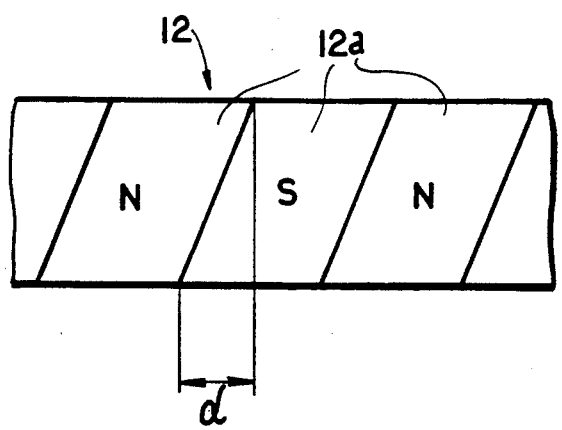

The ring magnet 12 having a radial anisotropy and arranged vis-a-vis the salient poles 14 is magnetized in a manner illustrated in FIGS. 2(a) and (b). As seen from these graphic illustrations, the ring magnet 12 having a radial anisotropy has a skewedly arranged pattern of magnetization 12a and the degree of skewed arrangement relatively to its longitudinal axis is expressed by $\alpha$ in FIG. 2(b) showing an extended plan view of the ring magnet.

Figure 3A:
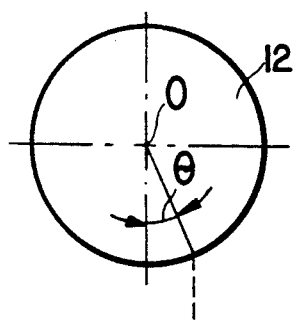
FIG. 3(a) and (b) respectively show a schematic plan view and a side view of the pattern of magnetization of the ring magnet of FIGS. 2(a) and (b)
Figure 3B:
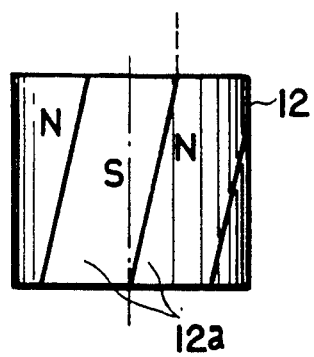

If the angle of skewed magnetization relative to the center of rotation O of the motor is $\Theta$ as shown in FIG. 3(a), it is expressed in terms of the slot pitch (angle) $\beta$ by the formula shown below.

$$\Theta = (0.8 \sim 1.05) \times \beta/2$$

More specifically, the value of $\Theta$ in this embodiment is between 29° and 31°.

Figure 4:
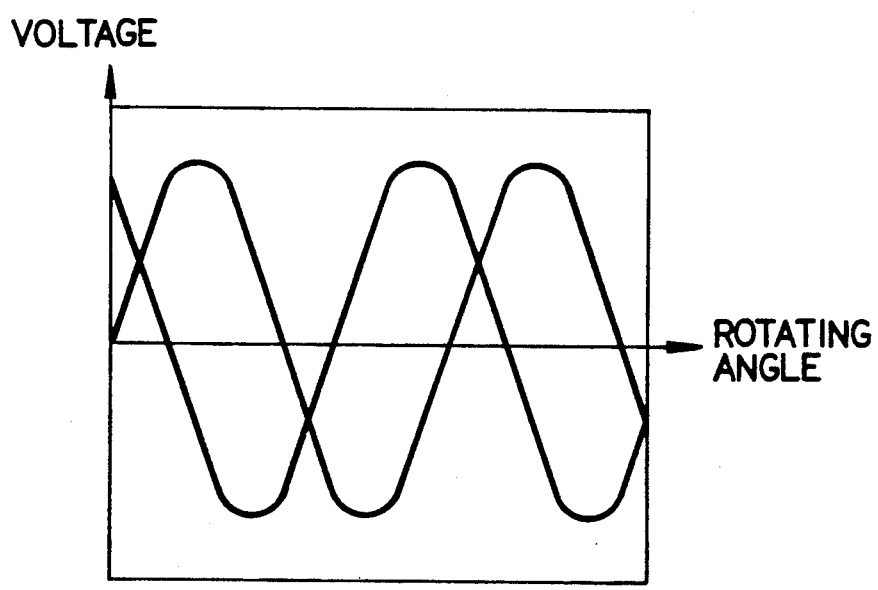
FIG. 4 is a graphic illustration of the waveform of the voltage induced by a rotating electric machine according to the invention.
Figure 5:
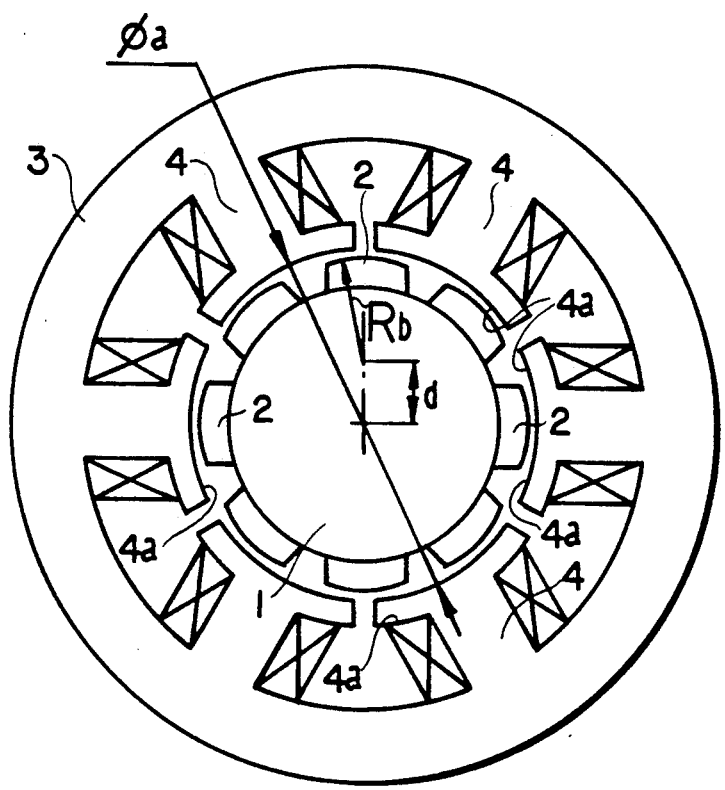
FIG. 5 is a plan view of a conventional rotating electric machine.
Figure 6:
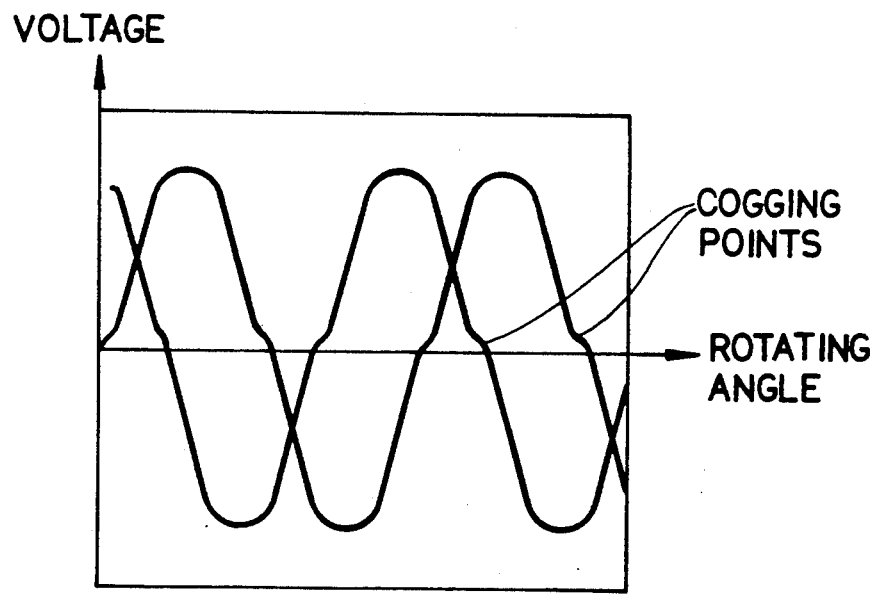
FIG. 6 is a graphic illustration of the waveform of the voltage induced by a conventional rotating electric machine.

With the embodiment having an arrangement as described above, any abrupt changes of magnetic fields that may take place on the salient poles 14 are moderated by the bevelled areas 14 at the lateral ends of the salient poles 14 so that the induced voltage of the ring magnet 12 having a radial anisotropy shows a sustained sinusoidal waveform as illustrated in FIG. 4 and consequently the level of cogging is minimized.

The ring magnet 12 having a radial anisotropy and disposed vis-a-vis the salient poles 14 carries a skewedly arranged pattern of magnetization 12a relative to its axis which is particularly effective for maintaining the sinusoidal waveform of the induced voltage and minimizing the level of cogging. It has been confirmed that the level of cogging torque of the embodiment having a ring magnet with a skewedly arranged pattern of magnetization as described above is approximately an eighth of the level of a similar machine having a ring magnet without a skewedly arranged pattern of magnetization.

While the above described embodiment is realized by applying the concept of the invention to an inner rotor type rotating electric machine, the present invention is not limited thereto and is applicable to an outer rotor type rotating electric machine comprising an armature arranged opposite the inner periphery of a magnet rigidly fitted to the inner periphery of a rotor, a plurality of radially and outwardly projecting salient poles being arranged vis-a-vis the armature.

As is apparent from the above description, since the salient poles of a rotating electric machine according to the invention are provided with bevelled areas as the lateral ends, and the ring magnet of a rotating electric machine according to the invention is skewedly magnetized relative to the axis of the ring magnet, its induced voltage can show a sustained sinusoidal waveform which is free from high harmonics to an extent greater or equal to that of a rotating electric machine comprising a segmented magnet albeit the rotating electric machine of the invention comprises a ring magnet having a radial anisotropy. Consequently, the level of cogging of the machine of the invention can be minimized.

While the foregoing description and drawings represent the preferred embodiments of the present invention, it will be obvious to those skilled in the art that various changes and modifications may be made therein without departing from the true spirit and scope of the present invention.

What is claimed is:

1. A rotating electric machine comprising:
   a magnet rigidly fitted to a rotary shaft;
   an armature arranged opposite a periphery of said magnet, said armature having a plurality of salient poles arranged on it and projecting toward said magnet, each of said salient poles having a surface wherein the surface of each of said salient poles facing said magnet comprises bevelled areas arranged at lateral ends thereof and wherein said magnet is a hollow cylindrical ring magnet and is skewedly magnetized relative to its axis, wherein a relationship, f, of distance between said bevelled areas of a pair of oppositely disposed salient poles with respect to a similar distance, e, between conventional non-bevelled areas of a pair of oppositely disposed salient poles in a conventional rotating machine of an identical type is defined by the equation: $f = (1.02 \sim 1.08) \times e$, said arrangement of salient poles and magnet being effective to minimize cogging in said machine.

2. A rotating electric machine as in claim 1 wherein said periphery of said magnet is an outer periphery and said surface of said salient poles is an inner surface.

3. A rotating electric machine as in claim 1 wherein a angle of skewed magnetization, $\Theta$, of the ring magnet to a center of motor expressed in terms of the slot pitch $\beta$ is:

$$\Theta = (0.8 \sim 1.05) \times \beta/2.$$

4. A rotating electric machines as in claim 3 wherein $\Theta$ is a value between 29° and 31°.

* * * * *